Nov. 3, 1953 R. E. DE COLA 2,658,163

ENERGY-SUPPLY SYSTEM

Filed Nov. 23, 1951

INVENTOR.
RINALDO E. DeCOLA
BY Laurence B. Dodds
ATTORNEY

Patented Nov. 3, 1953 2,658,163

UNITED STATES PATENT OFFICE 2,658,163

ENERGY-SUPPLY SYSTEM

Rinaldo E. De Cola, Park Ridge, Ill., assignor to Hazeltine Research, Inc., Chicago, Ill., a corporation of Illinois Application November 23, 1951, Serial No. 257,919

12 Claims. (Cl. 315—27)

*General*

Figures 1, 2:
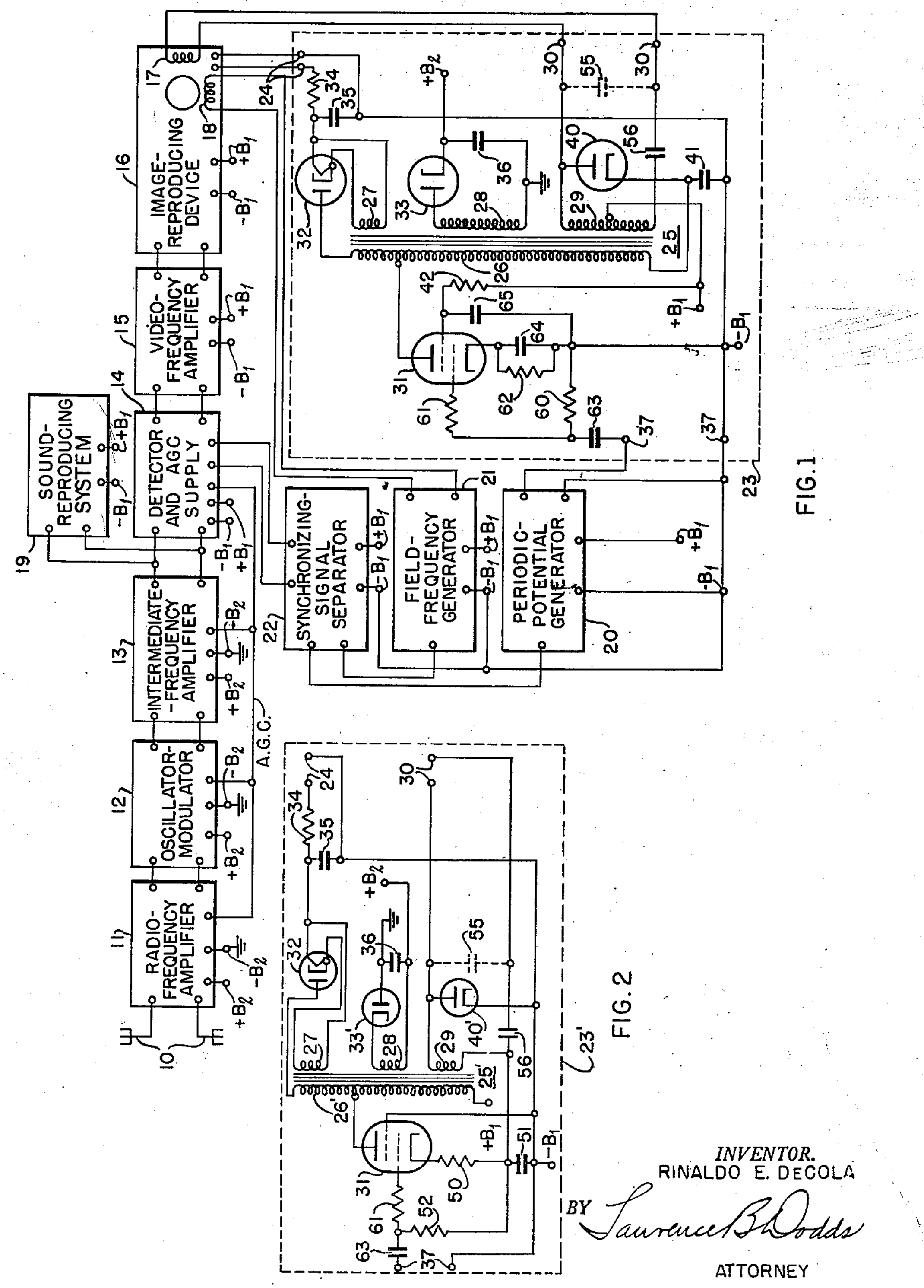

The present invention relates to energy-supply systems for supplying unidirectional potentials of different orders of magnitude and also currents of saw-tooth wave form to an inductive load. While the invention has other applications, it has particular utility as a source of high operating potentials for those circuits of a "transformerless" television receiver which are most affected by the now conventional use of a floating "B" potential supply.

Conventionally, television receivers use a power-supply transformer for energizing a rectifier circuit to supply a source of "B" potential for the vacuum tubes, thereby isolating the unidirectional potential-supply source from the power main. If only a rectification circuit including voltage-multiplier circuits directly coupled to the power main is used, the danger to the user of harmful electrical shocks is increased. In such a receiver, conventionally known as a "transformerless" television receiver, in order to protect the user from such a shock hazard, the low unidirectional voltage side of the "B" potential-supply system is usually connected to chassis ground through a high impedance, thereby interposing a current-limiting means between the chassis and one side of the power main. Thus, if the chassis is touched by a user who is also in contact with ground and the low unidirectional potential side of the supply happens to be connected to an ungrounded side of the power main, the user would receive only a minor shock.

Due to the presence of the current-limiting impedance, all of the circuits using the unidirectional supply means as a source of "B" potential have a common load circuit in the impedance. It is well known that such an impedance, being responsive to the individual variations of the signal developed in the different circuits, produces regenerative effects in these circuits. Thus, in the radio-frequency and intermediate-frequency circuits of a television receiver operating at conventional frequencies, there is a tendency for undesirable regeneration to occur between the stages of these circuits. This regeneration normally undesirably alters the response characteristics of the affected stages and tends to develop uncontrollable oscillations therein.

Conventional television receivers of the "transformerless" type use numerous arrangements to offset the effect of the common load impedance. Generally, the arrangements developed for the different receiver designs are the result of much experiment rather than of engineering skill. For this reason, when a "transformerless" type of television receiver is being designed, much time is spent in overcoming the undesired effects of the common load impedance. Though the results attained may be acceptable, such results usually vary between the different receivers of the same design and with changes in the component parts of these receivers especially when replacement parts are needed during normal servicing of the receiver. In addition, due to the employment of compensation circuits to counterbalance the undesired effects, the cost of receivers of the "transformerless" type is generally increased. Such an unstable solution of the regeneration problem is not entirely satisfactory and the increased cost is undesirable.

As a result of improved engineering and the availability of more efficient components, modern television receivers utilize the stages of the receiver in a very efficient manner and generally consume less power in each stage than was needed in the earlier television receivers. In addition, some of the circuits in the modern television receiver are so designed that, in operating in accordance with their primary functions, they are capable of developing energy which may be used for other purposes. One of these circuits is the deflection circuit for deflecting the electron beam of the cathode-ray tube horizontally and for developing the high unidirectional potential for the second anode of the cathode-ray tube. Due to the increased efficiency of modern horizontal deflection circuits, it is now conventional to utilize therein either transformers or vacuum tubes or both which have lower power output than in former receivers, thereby slightly diminishing the cost of these circuits. It appears desirable to construct a relatively high power horizontal deflection circuit and utilize the excess power available therein to provide a source of "B" potential for at least the radio-frequency, first detector and intermediate-frequency circuits of a "transformerless" type of receiver. Since, in such a source of supply the low side of the "B" potential can be directly connected to chassis ground, the problems of undesirable regeneration and of compensation therefor are overcome in a most efficient manner at little or no increase in the cost of the receiver.

It is an object of the invention, therefore, to provide a new and improved energy-supply system which avoids the above-mentioned limitations of prior supply systems.

It is another object of the invention to provide for a "transformerless" type of television receiver a new and improved energy-supply system which provides a source of "B" potential to at least some of the tubes in the receiver in such a manner as to reduce or eliminate undesired regenerative effects.

It is still another object of the invention to provide in a "transformerless" type of television receiver a new and improved energy-supply system which utilizes power developed in the horizontal deflection circuit of a television receiver to develop operating potentials for at least some of the tubes in the receiver.

In accordance with a particular form of the invention, an energy-supply system comprises an electron-discharge device having input and output electrodes, means for applying to the input electrodes a periodic potential and a load circuit for the device coupled to the output electrodes thereof. The load circuit includes a portion having a device of unidirectional conductivity and having means for coupling an inductor to this portion to constitute therewith a primarily inductive load for the aforementioned electron-discharge device for periodically developing current of saw-tooth wave form and a potential of pulse wave form in the aforementioned portion. The load circuit also includes a potential-supply system having a plurality of circuits one of which includes a first rectifier device responsive to the potential of pulse wave form for deriving a first unidirectional potential and a second rectifier device responsive to the potential of pulse wave form for deriving a unidirectional potential of a lower order of magnitude than the potential of the first device.

For a better understanding of the present invention, together with other and further objects thereof, reference is had to the following description taken in connection with the accompanying drawing, and its scope will be pointed out in the appended claims.

In the accompanying drawing, Fig. 1 is a circuit diagram, partly schematic, of a complete "transformerless" type of television receiver including an energy-supply system in accordance with a particular form of the present invention; and Fig. 2 is a circuit diagram of another form of the energy-supply system in accordance with the invention.

*General description of receiver of Fig. 1*

Referring now more particularly to Fig. 1 of the drawing, the "transformerless" television receiver there represented is of the superheterodyne type and includes an antenna system 10, 10 coupled to the input circuit of a radio-frequency amplifier 11 of one or more stages. There is coupled to the amplifier 11, in cascade in the order named, an oscillator-modulator 12, an intermediate-frequency amplifier 13 of one or more stages, a detector and automatic-gain-control or A. G. C. supply 14, a video-frequency amplifier 15 of one or more stages and a cathode-ray tube image-reproducing device 16 of conventional construction provided with the usual line-frequency and field-frequency deflection coils 17 and 18, respectively, for deflecting the cathode-ray beam in two directions normal to each other. The A. G. C. supply of unit 14 is connected to the input circuits of one or more of the stages 11, 12 and 13 by the conductor marked A. G. C. There is also connected to the output terminals of the intermediate-frequency amplifier 13 a conventional sound-reproducing system 19 which may comprise the usual sound intermediate-frequency amplifier, frequency detector, audio-frequency amplifier and a loudspeaker.

An output circuit of the detector 14 is coupled to the input circuit of a periodic-potential generator 20 proportioned to develop a potential of saw-tooth wave form at line frequency and to a field-frequency generator 21 through a synchronizing-signal separator 22. The output circuit of the field-frequency generator 21 is coupled in a conventional manner to the field-scanning or deflection coil 18 of the image-reproducing device 16 while the output circuit of the periodic-potential generator 20 is coupled to the line-scanning or deflection coil 17 through an energy-supply system 23 in accordance with the present invention. The supply system 23 in conjunction with the periodic-potential generator 20 effectively comprises the line-frequency generator for the television receiver, the unit 23 being described in more detail hereinafter. An anode-excitation potential for the image-reproducing device 16 is supplied from the energy-supply system 23 through the terminals 24, 24.

The "B" potential for each of the units 14—16, inclusive, and 19–22, inclusive, is supplied through a pair of terminals $-B_1$ and $+B_1$ from a source of such potential which is conventional in "transformerless" receivers of the type being described. One such source is a rectifier system coupled to the power main without the interposition of a transformer. As mentioned previously herein, in order to minimize the shock hazard to the user when such a source is employed, neither the potential $-B_1$ or $+B_1$ is directly connected to chassis ground, the potential $-B_1$ being normally connected to such ground through a current-limiting impedance. It is this impedance which causes the aforementioned regenerative effects. To minimize such regenerative effects in the units which are most responsive thereto, each of the units 11–13, inclusive, is supplied through a pair of terminals $+B_2$, $-B_2$ with "B" potential from another source of such energy which may have the potential $-B_2$ connected to chassis ground. This latter source of "B" potential is developed in the unit 23 in a manner to be described more fully hereinafter.

It will be understood that the various units of the receiver just described, with the exception of the energy-supply system 23 which is constructed in accordance with the present invention and which will be described more fully hereinafter, may be of conventional construction and operation, the details of which are well known in the art rendering a detailed description and explanation of the operation thereof unnecessary herein.

*General explanation of the operation of the receiver of Fig. 1*

Considering briefly, however, the general operation of the above-described receiver as a whole, television signals intercepted by the antenna system 10, 10 are selected and amplified in the radio-frequency amplifier 11 and are supplied to the oscillator-modulator 12 wherein they are converted into intermediate-frequency signals. The latter signals, in turn, are selectively amplified in the amplifier 13 and are applied to the detector and automatic-gain-control supply 14. The video-frequency modulation components of the applied signal are derived by the detector 14 and are amplified in the video-frequency amplifier 15 for application to the input circuit of the image-reproducing device 16. A control voltage derived in the automatic-gain-control supply portion of the unit 14 is applied as a bias to the gain-control circuits of the units 11, 12 and 13 to maintain the signal inputs to the detector of the unit 14 and to the sound-reproducing device 19 within a relatively narrow range for a wide range of received signal intensities.

The unit 22 selects the synchronizing signals from the other modulation components of the composite video-frequency signal applied thereto from the detector 14. The line-synchronizing and field-synchronizing signals derived in the unit 22 are then applied, respectively, to the generators 20 and 21 to synchronize the operation thereof. The unit 20 develops a periodic potential, specifically a substantially saw-tooth potential at line frequency for application to the energy-supply system 23 to control the operation thereof. An electron beam is produced in the cathode-ray image-reproducing device 16 in a conventional manner and the intensity of this beam is controlled in accordance with the video-frequency and bias-control voltage impressed on the brilliancy-control electrode from the amplifier 15. Saw-tooth current waves are generated in the energy-supply system 23, as will be explained more fully hereinafter, and also in the field-frequency generator 21 and are applied to the proper deflection coils in the image-reproducing device 16 thereby to deflect the cathode-ray beam of the unit 16 in two directions normal to each other to trace a rectilinear scanning raster on the screen of the cathode-ray tube and thereby reconstruct the televised image.

The sound intermediate-frequency signal is applied to the device 10 and amplified therein. The audio-frequency modulation components of the signal are derived in a conventional manner by a frequency detector in the device 19, amplified by an audio-frequency amplifier, and applied to a loudspeaker for conversion to sound.

*Description of energy-supply system of Fig. 1*

Referring now more particularly to the section of the Fig. 1 receiver embodying the present invention, the energy-supply system 23 comprises an electron-discharge device having input and output electrodes, specifically, a tetrode vacuum tube 31 having a control electrode and a cathode as input electrodes, and an anode and the cathode as output electrodes. The control electrode of the tube 31 is coupled to one of a pair of terminals 37, 37 through a resistor 61, and a coupling condenser 63, and through the resistor 61 and a biasing resistor 60 to the other one of the terminals 37, 37 and thus to the potential $-B_1$. The cathode of the tube 31 is connected to the potential $-B_1$ through a biasing network including parallel-connected resistor 62 and condenser 64. The values of the network including the resistor 62 and the condenser 64, and of the network including the resistors 60 and 61 and the condenser 63, are so proportioned as to bias the tube 31 at anode-current cutoff during the initiation of the trace portion of a saw-tooth wave voltage applied from unit 20 and to permit the tube to become conductive during at least a portion of the trace portion of the applied saw-tooth wave voltage. The screen electrode of the tetrode 31 is by-passed for all signal energy by means of a condenser 65 and is connected to the source of potential $+B_1$ through a resistor 42.

The system 23 also includes a load circuit for the device 31, specifically, the circuit coupled between the anode and cathode of the tube 31 and now to be described in detail. This load circuit includes a portion, specifically, a primary winding 26 of a transformer 25 coupled by means of a tap on the winding 26 to the anode of the tube 31, and a secondary winding 29 having a tapped connection to the source of potential $+B_1$. One terminal of the winding 26 is coupled through a condenser 41 to the potential $-B_1$ and one end of the winding 29 is coupled to one of a pair of terminals 30, 30 and through a series circuit of a unidirectional conduction device, specifically, a diode 40, and the condenser 41 to the potential $-B_1$. The other terminal of the winding 29 is coupled through a condenser 56 to the other one of the terminals 30, 30. The circuit including the diode 40 is so proportioned as to permit the utilization of the energy periodically stored in the deflection winding 17 at the start of the intervals of the saw-tooth current wave developed in the winding 17. The condenser 41 is proportioned to have such capacitance as to store the energy flowing through the diode 40 for utilization in increasing the potential $+B_1$ applied to the anode of the tube 31 in order to develop more current of saw-tooth wave form in the winding 17 than would normally be developed therein. The terminals 30, 30 are means for coupling an inductor, specifically, the deflection winding 17, to the transformer winding 29. A condenser 55, represented in broken-line construction since it may be comprised in whole or in part of the distributed capacitance of the winding 17 and the transformer 25, together with the other elements of the circuits coupled to the transformer 25, is effectively connected across the terminals 30, 30. The winding 17 constitutes with the portion of the load circuit including the windings 26 and 29, the diode 40 and the condensers 41, 55 and 56, a primarily inductive load for the device 31 in which there are periodically developed currents of saw-tooth wave form and potentials of pulse wave form.

The load circuit for the tube 31 also includes a potential-supply system having a plurality of circuits. One of these circuits includes a first rectifier device and is responsive to the potential of pulse wave form for deriving a first unidirectional potential of the order of 5000–15,000 volts therefrom. More specifically, this circuit includes a diode 32 having the anode thereof connected to the high-potential terminal of the winding 26, and the cathode thereof coupled through a filter network including a resistor 34 and a condenser 35, and through terminals 24, 24 to the second anode (not shown) of the device 16. The heater of the cathode of the diode 32 is coupled to a filament winding 27 of the transformer 25.

Another of the plurality of circuits of the potential-supply system includes a second rectifier device responsive to the potential of pulse wave form for deriving a unidirectional potential of a lower order of magnitude than the first-mentioned unidirectional potential, specifically, of the order of 125 volts. This other circuit includes a secondary winding 28 of the transformer 25 having a rectifier diode 33 and a filter condenser 36 connected in series thereacross. The winding 28 normally has more turns than the winding 29 and is so coupled to the windings 26 and 29 that the signal developed across the diode 33 is similar to but of a higher potential than the signal developed across the diode 40.

The junction of the cathode of the diode 33 and the condenser 36 is connected to a terminal $+B_2$ for supplying a source of potential $+B_2$, chassis ground becoming the potential $-B_2$ by the connection of the junction of the winding 28 and the condenser 36 thereto. The potentials $-B_2$ and $+B_2$ are connected, respectively, through chassis ground and conductors, which for simplicity are not shown, to the units 11, 12 and 13 to supply $B_2$ potential energy therefor.

*Explanation of the operation of energy-supply system of Fig. 1*

The operation of an energy-supply system such as the unit 23 of Fig. 1 but not including the additional unidirectional potential supply comprising the secondary winding 28 and the diode rectifier 33 is fully explained in an article entitled "Magnetic Deflection of Kinescopes," by Kurt Schlesinger, in the August 1947 issue of the Proceedings of the IRE, at pages 813–821, inclusive. In general, a periodic potential having generally a saw-tooth wave form, but including a negative pulse portion between the termination of the retrace and the initiation of the trace of the saw-tooth wave portion, is developed in the generator 20 and applied to the input circuit of the tube 31. The wave form of the applied potential is similar to that usually applied by a multivibrator driver stage to a succeeding line-scanning amplifier of a conventional television receiver.

Considering now a complete cycle of operation of the system 23, the tube 31 becomes conductive during the trace portion of the saw-tooth potential applied to the input circuit thereof and, through windings 26 and 29, causes a component of current of modified saw-tooth wave form to be applied to the deflection winding 17. Upon the application of the negative pulse portion to the input circuit of the tube 31, this tube becomes nonconductive and the energy stored in the winding 17 flows into the condenser 55 to cause the resonant circuit including these components to oscillate at a frequency higher than line frequency. The signal developed in the resonant circuit includes portions both positive and negative with respect to the negative potential $-B_1$ and with respect to chassis ground. The diode 40 is rendered conductive at the initiation of the trace portion of the saw-tooth signal and during the positive portion of the signal developed in the resonant circuit and applied to the anode of the diode 40 to damp the oscillation in the resonant circuit. The current flow in the tube 31 in the resonant circuit and in the tube 40 is effective to develop a resultant current in the winding 17 which has a desired saw-tooth wave form over the period of each line of the raster. The flow of current in the diode 40 is effective to develop a unidirectional potential across the condenser 41. This potential combines with the potential $+B_1$ to develop an increased anode potential for the tube 31 to effect greater current flow therethrough during the conductive periods thereof. Thus, the tube 40 serves the dual purpose of assisting in developing current of proper saw-tooth wave form to flow through the winding 17 and in utilizing the current flowing through the tube 40 to develop a potential which is effective to improve the efficiency of operation of the tube 31.

The signal developed across the winding 26 is normally of higher amplitude than and inverted with respect to the signal developed across the winding 29. Thus, during the retrace period of the saw-tooth signal, the negative portion of the signal developed by the resonant circuit across the winding 29 becomes a high-potential positive signal developed across the winding 26. The latter signal is applied to the anode of the diode 32 wherein it is peak rectified and the rectified signal is translated through the filter network 34, 35 to provide a high unidirectional potential for application through the terminals 24, 24 to the second anode of the tube in the device 16.

Since there is developed across the diode 33 a signal similar to the signal across the diode 40 and a signal which is the inverse of the signal across the winding 26, the diode 33 conducts at the same time as the diode 40, that is, during the trace portion of the saw-tooth wave signal, to develop another unidirectional potential across the condenser 36. The latter potential is of a lower order of magnitude than the above-mentioned unidirectional potential, being approximately 125 volts in a television receiver of the type under consideration and is applied as a "B" potential through the terminals $+B_2$ and $-B_2$ in each of the units 11, 12 and 13. In view of the fact that the potential $-B_2$ is connected to chassis ground, the regenerative effects and the costly compensation circuits normally utilized to minimize such effects may be substantially eliminated.

It should be understood that the energy consumed in the rectifier circuit including the diode 33 and the efficiency circuit including the diode 40 is obtained from energy developed in the resonant circuit including the deflection winding 17 and the condenser 55. Therefore, the energy obtained in either one of these circuits is acquired only at the expense of some loss of energy in the other circuit. It is for this reason that the power capacity of the tube 31 and of the transformer 25 may have to be increased in order to supply the desired amount of energy. Also, due to the limited amount of the available power in the deflection circuit, $B_2$ potentials are not provided for all stages of the television receiver. Therefore, the stages other than those of units 11, 12 and 13, as has been explained previously herein, are operated from the floating $B_1$ potential supply. The operation of such other stages in that manner usually does not introduce highly objectionable regenerative problems and, therefore, is acceptable.

*Description of energy-supply system of Fig. 2*

Referring now to Fig. 2 of the drawing, there is represented a circuit diagram of a modified form of an energy-supply system in accordance with the present invention. This system is very similar to the system 23 of Fig. 1 and, therefore, corresponding elements thereof are designated by the same reference numerals, analogous elements by the same reference numerals primed. The type of energy-supply system represented by Fig. 2, except for the circuit including the components 28 and 33', is fully described in the applicant's copending application Serial No. 162,589, filed May 17, 1950, and entitled "Periodic-Wave Generator."

In general, the energy-supply system of Fig. 2 differs from the unit 23 of Fig. 1 in that the diode 33' is poled oppositely to the diode 33 of Fig. 1. In addition, the screen electrode of the tube 31 is connected directly to the source of potential $-B_1$, the cathode thereof is coupled through a biasing resistor 50, a condenser 51 to the source of potential $-B_1$ and a grid-bias resistor 52 is coupled through the condenser 51 to the source of potential $-B_1$. Another important difference between the systems of Fig. 1 and Fig. 2 is the manner in which the unidirectional potential developed by the efficiency diode 40' is applied to the tube 31 to boost the current flowing therethrough. The source of potential $+B_1$ is connected through the primary winding 26' to the anode of the tube 31 while the lower terminal of the secondary winding 29 is connected to the junction of the resistor 50 and the condenser 51, the cathode of the diode 40' being connected directly to the source of potential $-B_1$.

*Explanation of the operation of energy-supply system of Fig. 2.*

The operation of the energy-supply system of Fig. 2, except for that portion of the load circuit comprising the secondary winding 28 and the diode 33', is fully described in the application referred to above. In general, the operation of the system of Fig. 2 is similar to that of the corresponding system in Fig. 1. Therefore, only the pertinent differences will be discussed herein.

With respect to the winding 28 and the diode 33', in view of the reversed polarity of the diode 33', this diode is responsive during the retrace portion of the saw-tooth signal to the signal developed across the winding 28 in a manner similar to the response of the diode 32 to the signal across the winding 26. The $B_2$ potential is developed across the condenser 36. Since in the energy-supply system of Fig. 2 the diodes 32 and 33' conduct substantially simultaneously during the retrace portion of the saw-tooth signal, the energy developed for the $B_2$ supply diminishes the amount of energy available for the rectifier circuit including the diode 32.

Due to the manner in which the diode 40' and the cathode circuit of the tube 31 are connected, the positive potential which is developed across the condenser 41 in unit 23 of Fig. 1 appears as a negative potential developed across the condenser 51 in the system of Fig. 2. This negative potential serves to depress the potential level of the cathode of the tube 31 thereby effectively increasing the potential difference between the cathode and the screen electrode and anode of this tube. As a result, the potential developed by the diode 40' serves to increase the saw-tooth wave current in the tube 31 in a manner similar to that described with reference to the unit of Fig. 1. Since the screen electrode of the tube 31 is grounded and the potential developed on the cathode is negative with respect to ground, the screen electrode is effectively maintained at a potential which is positive with reference to the cathode. Therefore, in the event of a short circuit in the horizontal scanning circuit or some other abnormal operating condition therein, the flow of space current in the tube 31 is immediately cut off, since the screen electrode-cathode potential of the tube will effectively become zero. In this manner the elements of the deflection circuit are protected from overload.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An energy-supply system for a television receiver comprising: an electron-discharge device having input and output electrodes; means for applying to said input electrodes a periodic potential; and a load circuit for said device coupled to said output electrodes, including a portion having a device of unidirectional conductivity and having means for coupling an inductor to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a unidirectional potential of a lower order of magnitude than said first unidirectional potential.

2. An energy-supply system for a television receiver comprising: an electron-discharge device having input and output electrodes; means for applying to said input electrodes a periodic potential; and a load circuit for said device coupled to said output electrodes, including a transformer having a primary and a plurality of secondary windings, including a portion having said primary winding, one of said secondary windings, a device of unidirectional conductivity coupled across said one secondary winding and having means for coupling an inductor to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a unidirectional potential of a lower order of magnitude than said first unidirectional potential.

3. An energy-supply system for a television receiver comprising: an electron-discharge device having input and output electrodes; means for applying to said input electrodes a periodic potential; and a load circuit for said device coupled to said output electrodes, including a transformer having a primary and a plurality of secondary windings, including a portion having said primary winding, one of said secondary windings, a device of unidirectional conductivity coupled to said one secondary winding and having means for coupling an inductor to said one secondary winding to constitute with said portion a primarily inductive load for said electron-discharge device for periodically developing current of saw-tooth wave form and a potential of pulse wave form in said primary and secondary windings, including a potential-supply system having a plurality of circuits one of which includes a first rectifier device responsive to said potential of pulse wave form for deriving a first unidirectional potential therefrom and another of which includes a second rectifier device responsive to said potential of pulse wave fo for deriving a unidirectional potential of a lower order of magnitude than said first unidirectional potential.

4. An energy-supply system for a television receiver comprising: an electron-discharge device having input and output electrodes; means for applying to said input electrodes a periodic potential; and a load circuit for said device coupled to said output electrodes, including a transformer having a primary and a plurality of secondary windings, including a portion having said primary winding, one of said secondary windings, a device of unidirectional conductivity coupled across said one secondary winding and having means for coupling an inductor to said portion to constitute therewith a primarily inductive load for said electron-discharge device for periodically developing current of saw-tooth wave form and a potential of pulse wave form in said primary and secondary windings, including a potential-supply system having a plurality of circuits one of which includes said primary winding, a first rectifier device responsive to said potential of pulse wave form in said primary winding for deriving a first unidirectional potential therefrom and another of which includes a second rectifier device responsive to said potential of pulse wave form for deriving a unidirectional potential of a lower order of magnitude than said first unidirectional potential.

5. An energy-supply system for a television receiver comprising: an electron-discharge device having input and output electrodes; means for applying to said input electrodes a periodic potential; and a load circuit for said device coupled to said output electrodes, including a transformer having a primary and a plurality of secondary windings, including a portion having said primary winding, one of said secondary windings, a device of unidirectional conductivity coupled to said one secondary winding and having means for coupling an inductor to said portion to constitute therewith a primarily inductive load for said electron-discharge device for periodically developing current of saw-tooth wave form and a potential of pulse wave form in said primary and secondary windings, and including a potential-supply system having a plurality of circuits one of which includes a first rectifier device responsive to said potential of pulse wave form for deriving a first unidirectional potential therefrom and another of which includes another one of said secondary windings having a second rectifier device coupled thereto to derive from said potential of pulse wave form developed in said other secondary winding a unidirectional potential of a lower order of magnitude than said first unidirectional potential.

6. An energy-supply system for a television receiver comprising: an electron-discharge device having input and output electrodes; means for applying to said input electrodes a periodic potential; and a load circuit for said device coupled to said output electrodes, including a portion having a device of unidirectional conductivity and having means for coupling a cathode-ray tube beam-deflecting winding to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a unidirectional potential of a lower order of magnitude than said first unidirectional potential.

7. An energy-supply system for a television receiver comprising: an electron-discharge device having input and output electrodes; means for applying to said input electrodes a periodic potential; and a load circuit for said device coupled to said output electrodes, including a portion having an efficiency diode circuit and having means for coupling an inductor to said portion to constitute therewith a primarily inductive load for said device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a unidirectional potential of a lower order of magnitude than said first unidirectional potential.

8. An energy-supply system for a television receiver comprising: the power stage of a line-frequency generator having input and output electrodes; means for applying to said input electrodes a periodic potential; and a load circuit for said device coupled to said output electrodes, including a portion having a device of unidirectional conductivity and having means for coupling an inductor to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a unidirectional potential of a lower order of magnitude than said first unidirectional potential.

9. An energy-supply system for a television receiver comprising: an electron-discharge device having input and output electrodes; means for applying to said input electrodes a periodic potential; and a load circuit for said device coupled to said output electrodes, including a portion having a device of unidirectional conductivity and having means for coupling an inductor to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a unidirectional potential therefrom having a magnitude in the range of 5000–15,000 volts and another of which includes a second rectifier device responsive to said potential of pulse wave form for deriving a unidirectional potential of a magnitude in the range of 100–250 volts.

10. An energy-supply system for a television receiver comprising: an electron-discharge device having input and output electrodes; means for applying to said input electrodes a potential substantially of saw-tooth wave form; and a load circuit for said device coupled to said output electrodes including a portion having a device of unidirectional conductivity and having means for coupling an inductor to said portion to constitute therewith a primarily inductive load for said electron-discharge device for periodically developing current of saw-tooth wave form and a potential of pulse wave form in said portion, and including a potential-supply system having a plurality of circuits one of which includes a first rectifier device responsive to said potential of pulse wave form for deriving a first unidirectional potential therefrom and another of which includes a second rectifier device responsive to said potential of pulse wave form for deriving a second unidirectional potential of a lower order of magnitude than said first unidirectional potential, said first and second rectifier devices being so poled in said one and said other circuits, respectively, as to derive said first and said second unidirectional potentials during the retrace portion of said potential of said saw-tooth wave form.

11. An energy-supply system for a television receiver comprising: an electron-discharge device having input and output electrodes; means for applying to said input electrodes a potential substantially of saw-tooth wave form; and a load circuit for said device coupled to said output electrodes, including a transformer having a primary and a plurality of secondary windings, including a portion having said primary winding, one of said secondary windings, a device of unidirectional conductivity coupled to said one secondary winding and having means for coupling an inductor to said portion to constitute therewith a primarily inductive load for said electron-discharge device for periodically developing current of saw-tooth wave form and a potential of pulse wave form in said primary and secondary windings, and including a potential-supply system having a plurality of circuits one of which includes a portion of said primary winding, a first rectifier device responsive to said potential of pulse wave form in said primary winding for deriving a first unidirectional potential therefrom and another of which includes another one of said secondary windings having a second rectifier device coupled thereto and so poled as to derive from said potential of pulse wave form developed in said other secondary winding and during the trace portion of said potential of saw-tooth wave form, a unidirectional potential of a lower order of magnitude than said first unidirectional potential.

12. An energy-supply system for a television receiver comprising: an electron-discharge device having input and output electrodes; means for applying to said input electrodes a periodic potential; and a load circuit for said device coupled to said output electrodes, including a transformer having a primary and a plurality of secondary windings, including a portion having said primary winding, one of said secondary windings, a device of unidirectional conductivity coupled to said one secondary winding and having means for coupling an inductor to said portion to constitute therewith a primarily inductive load for said electron-discharge device for periodically developing current of saw-tooth wave form and a potential of pulse wave form in said primary and secondary windings, and including a potential-supply system having a plurality of circuits one of which includes a portion of said primary winding, a first rectifier device responsive to said potential of pulse wave form in said primary winding for deriving a first unidirectional potential therefrom and another of which includes another one of said secondary windings having a second rectifier device coupled thereto to derive from said potential of pulse wave form developed in said other secondary winding a unidirectional potential of a lower order of magnitude than said first unidirectional potential, said potential of pulse wave form developed in said other secondary winding being the inverse of said potential in said primary winding.

RINALDO E. DE COLA.

References Cited in the file of this patent

UNITED STATES PATENTS

| Number | Name | Date |
|---|---|---|
| 2,407,724 | Rasley | Sept. 17, 1946 |
| 2,555,827 | Tourshon et al. | June 15, 1951 |